United States Patent
Shimoda

(10) Patent No.: US 10,322,757 B2
(45) Date of Patent: Jun. 18, 2019

(54) LOWER VEHICLE STRUCTURE

(71) Applicant: TOYOTA JIDOSHA KABUSHIKI KAISHA, Toyota-shi (JP)

(72) Inventor: Akihiko Shimoda, Toyota (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 1 day.

(21) Appl. No.: 15/654,866

(22) Filed: Jul. 20, 2017

(65) Prior Publication Data
US 2018/0072352 A1  Mar. 15, 2018

(30) Foreign Application Priority Data
Sep. 9, 2016 (JP) ................... 2016-176321

(51) Int. Cl.
| | |
|---|---|
| *B62D 25/20* | (2006.01) |
| *B60K 1/04* | (2019.01) |
| *B60K 6/28* | (2007.10) |
| *B60K 6/40* | (2007.10) |
| *B60K 13/04* | (2006.01) |
| *B60R 16/04* | (2006.01) |
| *H01M 2/10* | (2006.01) |
| *H01M 2/08* | (2006.01) |

(52) U.S. Cl.
CPC .......... *B62D 25/20* (2013.01); *B60K 1/04* (2013.01); *B60K 6/28* (2013.01); *B60K 6/40* (2013.01); *B60K 13/04* (2013.01); *B60R 16/04* (2013.01); *H01M 2/08* (2013.01); *H01M 2/10* (2013.01); *B60K 2001/0438* (2013.01); *B60Y 2306/01* (2013.01)

(58) Field of Classification Search
CPC .. B62D 25/20; B60K 6/28; B60K 2001/0438; B60R 16/04; B60Y 2306/01

USPC .... 296/193.07, 204, 187.08, 187.12, 203.01, 296/209, 29, 30
See application file for complete search history.

(56) References Cited

U.S. PATENT DOCUMENTS

| | | | |
|---|---|---|---|
| 6,315,069 B1 * | 11/2001 | Suba | B60K 1/04 180/68.5 |
| 9,944,173 B2 * | 4/2018 | Ajisaka | B60K 13/04 |
| 2015/0069964 A1 * | 3/2015 | Kamikihara | B60L 11/182 320/108 |

FOREIGN PATENT DOCUMENTS

| | | |
|---|---|---|
| JP | 2001-115835 | 4/2001 |
| JP | 2001-138753 | 5/2001 |
| JP | 2008-174181 | 7/2008 |

* cited by examiner

*Primary Examiner* — Jason S Morrow
*Assistant Examiner* — E Turner Hicks
(74) *Attorney, Agent, or Firm* — Oblon, McClelland, Maier & Neustadt, L.L.P.

(57) ABSTRACT

A lower vehicle structure includes a floor panel, a battery, a first buffer, and a cylindrical exhaust pipe. The battery is located below the floor panel. The first buffer is located below the floor panel at an outer side of the battery in a widthwise direction of the vehicle. The first buffer is configured to deform in the widthwise direction in order to absorb an impact. The exhaust pipe is located below the floor panel. The exhaust pipe extends in a front-to-rear direction of the vehicle. A portion of the exhaust pipe is located between the battery and the first buffer in the widthwise direction. The first buffer includes a projection that projects toward the battery. The projection includes a distal end located downward from a center axis of the exhaust pipe.

7 Claims, 4 Drawing Sheets

LOWER VEHICLE STRUCTURE

BACKGROUND OF THE INVENTION

The present invention relates to a lower vehicle structure.

Japanese Laid-open Patent Publication No. 2001-138753 describes a lower vehicle structure that includes a floor panel forming the floor surface of a passenger compartment and a battery that is located below the floor panel to supply a vehicle travel motor with power. Further, the lower vehicle structure includes a cylindrical exhaust pipe located below the floor panel and extending in a front-to-rear direction of the vehicle. A portion of the exhaust pipe is located at the outer side of the battery in a widthwise direction of the vehicle.

SUMMARY OF THE INVENTION

The exhaust pipe is hollow and can function as a buffer that absorbs the force of an impact applied to the battery when an object strikes the vehicle from the outer side of the vehicle in the widthwise direction. However, the lower vehicle structure is not configured so that the exhaust pipe properly functions as a buffer.

A lower vehicle structure that solves the above problem is configured to be applied to a vehicle including an internal combustion engine and a travel motor. The lower vehicle structure includes a floor panel, a battery, a first buffer, and a cylindrical exhaust pipe. The floor panel forms a floor surface of a passenger compartment. The battery is located below the floor panel. The battery is configured to supply power to the travel motor. The first buffer is located below the floor panel at an outer side of the battery in a widthwise direction of the vehicle. The first buffer is configured to deform in the widthwise direction in order to absorb an impact. The exhaust pipe is located below the floor panel and extends in a front-to-rear direction of the vehicle. The exhaust pipe is configured so that exhaust gas from the internal combustion engine flows through the exhaust pipe. A portion of the exhaust pipe is located between the battery and the first buffer in the widthwise direction. The first buffer includes a projection that projects toward the battery, and the projection includes a distal end located downward from a center axis of the exhaust pipe in a vertical direction of the vehicle.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

One embodiment of a lower vehicle structure will now be described with reference to FIGS. 1 to 4. A front-to-rear direction of the vehicle and a vertical direction of the vehicle may be hereinafter referred to as the front-to-rear direction and the vertical direction. Further, the left side and the right side in a view of the vehicle from the rear toward the front may be hereinafter referred to as the left side and the right side.

Figure 1:
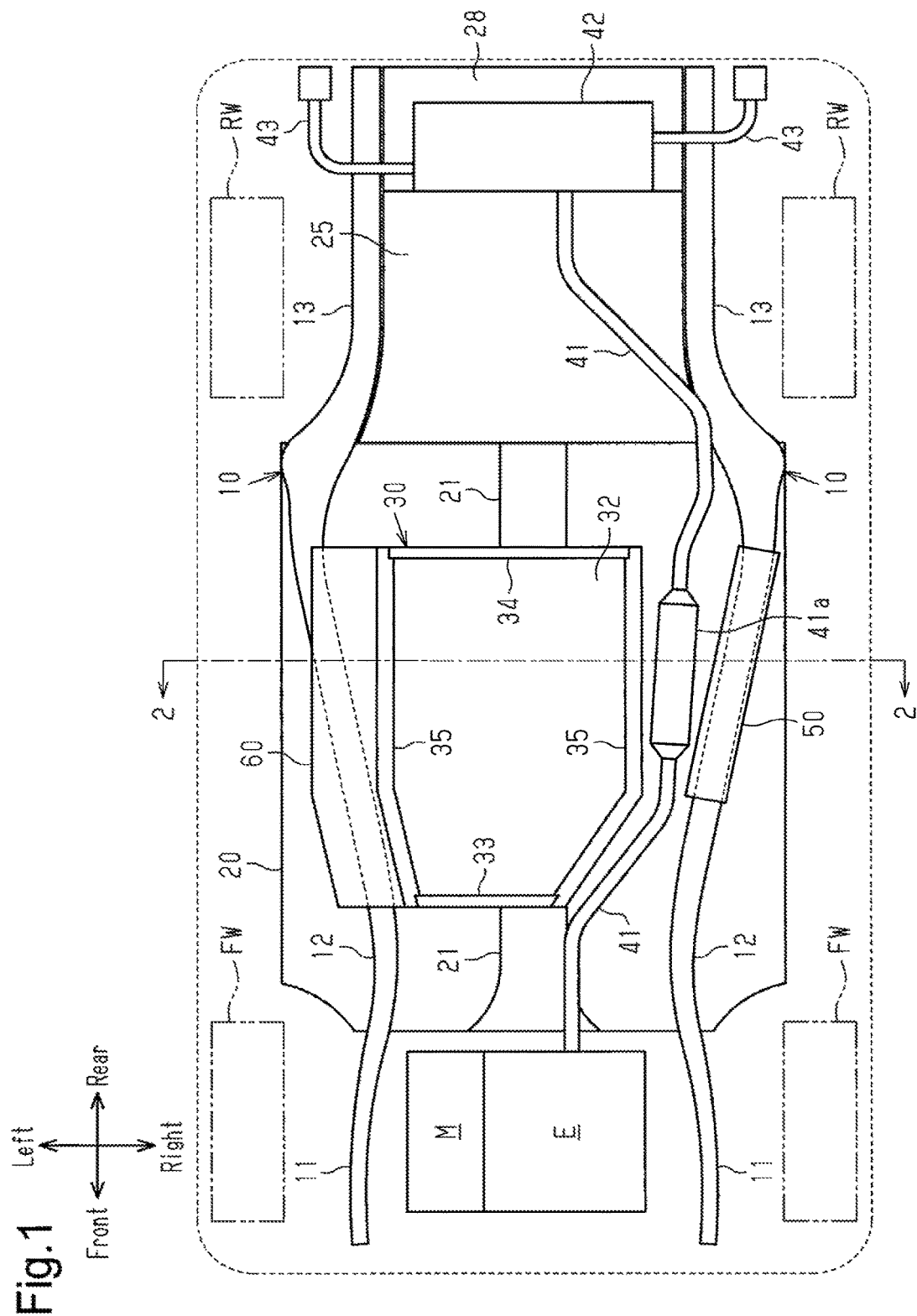
FIG. 1 is a bottom view showing a vehicle.
Figure 2:
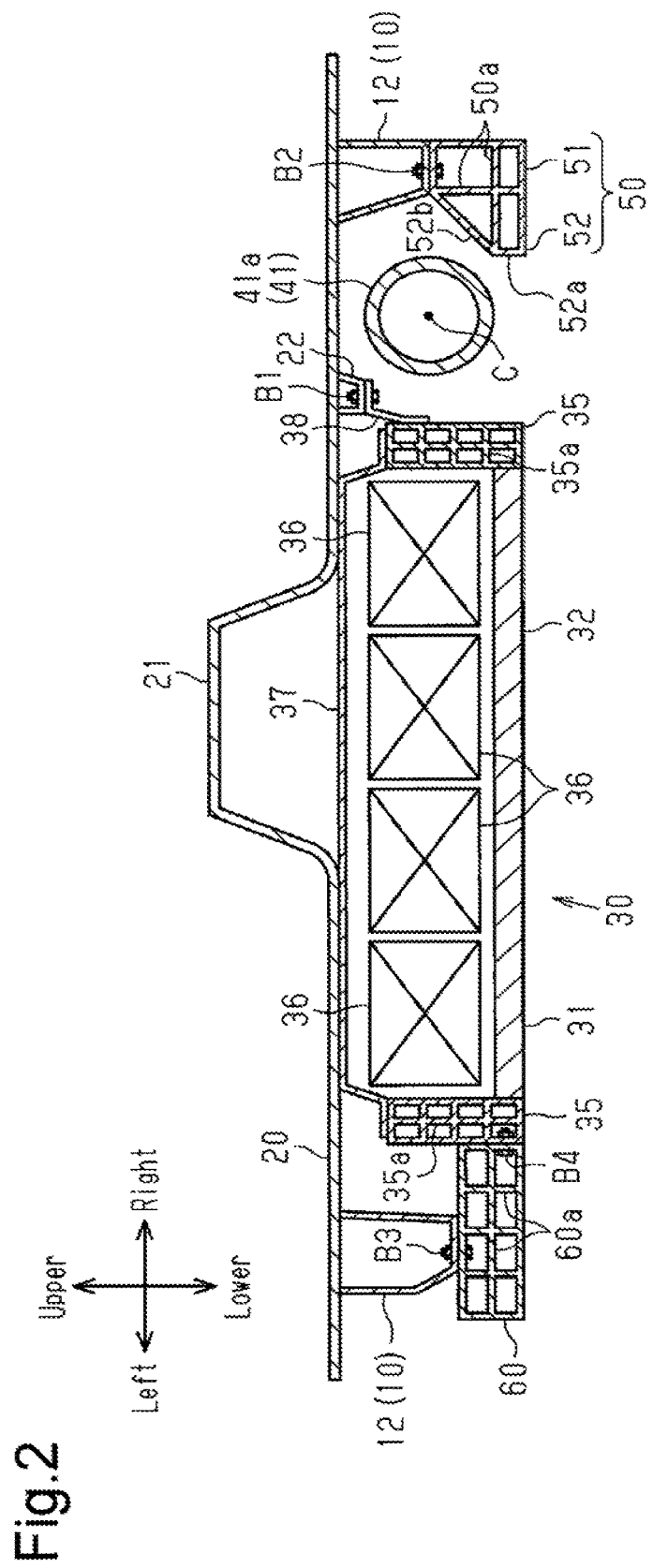
FIG. 2 is a cross-sectional view taken along line 2-2 in FIG. 1.

As shown in FIG. 1, the lower vehicle structure includes left and right side members 10 extending in the front-to-rear direction along substantially the entire vehicle from the front end to the rear end. Each side member 10 is formed by bending a steel plate and has a generally U-shaped cross section as shown in FIG. 2. The upper side with respect to the plane of FIG. 1 is the lower side of the vehicle, and the lower side with respect to the plane of FIG. 1 is the upper side of the vehicle.

As shown in FIG. 1, each side member 10 sequentially includes, from the front side, a front side member 11, a floor side member 12, and a rear side member 13. The left and right front side members 11 extend so that the distance in between gradually decreases from the front toward the rear. A rear end of each front side member 11 is continuous with a front end of the corresponding floor side member 12. The left and right floor side members 12 extend so that the distance in between gradually increases from the front toward the rear. A rear end of each floor side member 12 is continuous with a front end of the corresponding rear side member 13. The left and right rear side members 13 each include a first portion and a second portion. The first portion corresponds to approximately one-third of the entire length of each rear side member 13 and is continuous with the corresponding floor side member 12. The second portion corresponds to approximately two-thirds of the entire length of each rear side member 13 and is continuous with the corresponding first portion. The left and right first portions extend so that the distance in between gradually decreases from the front toward the rear. The left and right second portions extend parallel to each other.

As shown in FIG. 2, a floor panel 20, which is formed by a steel plate, is fixed to upper portions of the floor side members 12. The floor panel 20 forms the front side of the floor of the passenger compartment. As shown in FIG. 1, the floor panel 20 is rectangular in a plan view and extends toward the outer side in the widthwise direction beyond the floor side members 12. As shown in FIG. 2, the widthwise middle portion of the floor panel 20 includes a floor tunnel 21 that projects upwardly. The floor tunnel 21 is formed by bending the steel member that forms the floor panel 20. The floor panel 20 includes fixing portions 22 projecting downwardly from a lower surface of the floor panel 20. The fixing portions 22 are formed by bending the steel member, which forms the floor panel 20. FIG. 2 shows only one fixing portion 22.

As shown in FIG. 1, a rear floor panel 25, which is formed by a steel plate, is fixed to the upper front portions of the rear side members 13. The rear floor panel 25 forms the rear side of the floor of the passenger compartment. The dimension of the rear floor panel 25 in the widthwise direction is set in accordance with the distance between the left and right rear side members 13 so that the rear floor panel 25 does not project outwardly in the widthwise direction beyond the rear side members 13. A spare tire pan 28 that defines the accommodation compartment of a spare tire is fixed to the upper rear portions of the rear side members 13. The spare tire pan 28 is recessed toward the lower side (upper side with respect to the plane of FIG. 1) between the left and right rear side members 13.

An internal combustion engine E and a travel motor M, which serve as drive sources for driving the vehicle, are arranged between the front side members 11. The vehicle includes a front wheel FW located at the outer side of each front side member 11 in the widthwise direction. The vehicle includes a rear wheel RW located at the outer side of each rear side member 13 in the widthwise direction. In FIG. 1, the internal combustion engine E and the travel motor M are schematically shown in blocks.

As shown in FIG. 2, a battery 30 that supplies power to the travel motor M is fixed to the lower side of the floor panel 20. The battery 30 is located between the left and right floor side members 12. The center of the battery 30 is located at the left side of the center of the floor panel 20 (center of floor tunnel 21) in the widthwise direction. The battery 30 is connected to the travel motor M by a power cable (not shown).

The battery 30 includes a battery case 31, which in its entirety has the form of a box with a low profile. The battery case 31 includes a bottom wall 32, which is solid and flat. As shown in FIG. 1, in a plan view, the dimension of the bottom wall 32 in the widthwise direction is uniform from the rear end to the middle portion and decreases from the middle portion toward the front end.

The bottom wall 32 of the battery case 31 includes a front edge from which a front wall 33 projects toward the upper side (lower side with respect to plane of FIG. 1). The front wall 33 is solid and flat. The bottom wall 32 includes a rear edge from which a rear wall 34 projects toward the upper side. The rear wall 34 is solid and flat. As shown in FIG. 2, the bottom wall 32 includes left and right side edges from which side walls 35 project upwardly, respectively. The side walls 35 are hollow and flat. The side walls 35 include ribs 35*a* that couple opposing inner walls to each other. The front wall 33, the rear wall 34, and the left and right side walls 35 correspond to peripheral walls projecting from the edges of the bottom wall 32.

The battery case 31 accommodates battery cells 36. The battery cells 36 are unit batteries of nickel metal hydride batteries that are connected in series and modularized to obtain a predetermined output voltage. A cover 37 is fixed to the upper side of the battery case 31. The cover 17 covers an opening of the battery case 31. The cover 37 is fixed to the upper end surfaces of the front wall 33, the rear wall 34, and the left and right side walls 35.

As shown in FIG. 2, the side walls 35 each include plate-shaped coupling portions 38 extending toward the corresponding fixing portions 22. The coupling portions 38 are fixed to the corresponding fixing portions 22 by bolts B1 extending through circular holes of the coupling portions 38. The plurality of coupling portions 38 are arranged at different portions of each side wall 35 in correspondence with the plurality of fixing portions 22. However, FIG. 2 only shows one of the coupling portions 38.

As shown in FIG. 1, the lower side of the floor panel 20 includes a cylindrical exhaust pipe 41 through which exhaust gas flows from the internal combustion engine E. The exhaust pipe 41 is supported by a support (not shown) and suspended from the floor panel 20. The exhaust pipe 41 extends toward the rear from the internal combination engine E, which is located at the front side of the vehicle. Further, the exhaust pipe 41 extends by the right side of the battery 30 and the left side of the right floor side member 12 (side closer to middle portion in widthwise direction) and toward the rear of the vehicle. The exhaust pipe 41 includes a sub-muffler 41*a* that deadens the exhaust noise produced when exhaust gas flows through the exhaust pipe 41. The sub-muffler 41*a* is located at the right side of the battery 30. The sub-muffler 41*a* has a larger outer diameter than other portions of the exhaust pipe 41. As shown in FIG. 2, the lower end of the sub-muffler 41*a* is located upward from the lower end of the battery 30 (lower surface of bottom wall 32). The sub-muffler 41*a* defines a portion of the exhaust pipe 41.

As shown in FIG. 1, a muffler 42 that deadens the exhaust noise is connected to a rear end of the exhaust pipe 41. Each of the left and right ends of the muffler 42 includes a branch exhaust pipe 43. Each branch exhaust pipe 43 is bent at approximately 90° to extend toward the rear. Each branch exhaust pipe 43 includes a downstream end directed toward the rear of the vehicle.

As shown in FIGS. 1 and 2, a first buffer 50 is located below the right floor side member 12 extending in the extending direction of the right floor side member 12. The battery 30 is located between the left and right floor side members 12. Thus, the first buffer 50 is located at the outer side (right side) of the battery 30 in the widthwise direction. Further, the sub-muffler 41*a* of the exhaust pipe 41 is located between the battery 30 and the right floor side member 12. Thus, the sub-muffler 41*a* is located between the battery 30 and the first buffer 50 in the widthwise direction.

As shown in FIG. 2, the first buffer 50 is entirely tubular and includes ribs 50*a* that couple opposing inner walls to each other. The first buffer 50 is fixed to the floor side member 12 by a bolt B2 extending through a wall of the first buffer 50. When an object strikes the first buffer 50 from the outer side (right side) in the widthwise direction, the first buffer 50 deforms in the widthwise direction to absorb the impact. This reduces the force of the impact that acts on the battery 30.

The first buffer 50 includes a body 51 having a uniform dimension in the vertical direction and a projection 52 projecting from the body 51 toward the battery 30 (i.e., toward left side) and having a dimension in the vertical direction that decreases as the battery 30 becomes closer. The projection 52 includes a distal end 52*a* located downward from the lower end of the exhaust pipe 41 and located at the same height as the bottom wall 32 of the battery 30. The upper surface of the projection 52 is an inclined surface 52*b*. The inclined surface 52*b* is inclined upward from the distal end 52*a* and toward the outer side in the widthwise direction. That is, the portion of the inclined surface 52*b* separated from the distal end 52*a* toward the outer side in the widthwise direction is located upward in the vertical direction from the portion of the inclined surface 52*b* located closer to the distal end 52*a*. The right side member 10 (more specifically, right floor side member 12) includes a side surface opposed to the exhaust pipe 41 and inclined upward from the outer side and toward the inner side in the widthwise direction of the vehicle.

As shown in FIGS. 1 and 2, a second buffer 60 is located below the left floor side member 12 extending in the extending direction of the left floor side member 12. The second buffer 60 is hollow and flat. The second buffer 60 includes ribs 60*a* that couple opposing inner walls to each other. The second buffer 60 extends parallel to the floor panel 20. The second buffer 60 is fixed to the floor side member 12 by a bolt B3 extending through the upper wall of the second buffer 60. Further, the second buffer 60 is fixed to the left side wall 35 of the battery 30 by a bolt B4 extending through the inner wall of the second buffer 60 in the widthwise direction.

The behavior and advantages of the first buffer 50, the exhaust pipe 41, and the like in the lower vehicle structure when an object X strikes the vehicle from the right side will now be described.

Figure 3:
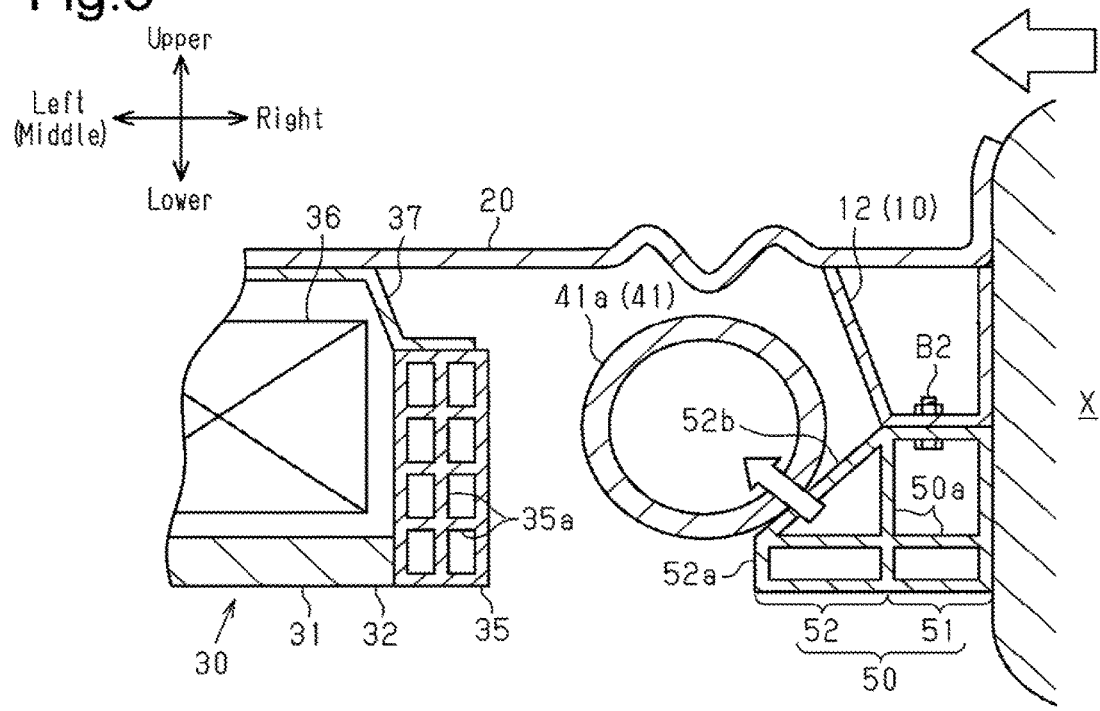
FIG. 3 is a diagram showing the behavior of a lower vehicle structure when an object strikes the vehicle from the outer side in a widthwise direction of the vehicle.

As shown in FIG. 3, the sub-muffler 41a of the exhaust pipe 41 is cylindrical and located at the right side of the battery 30 in the widthwise direction. Thus, when the object X strikes the vehicle from the right side and the sub-muffler 41a is deformed in the widthwise direction, the sub-muffler 41a can reduce the force of the impact that acts on the battery 30. However, the exhaust pipe 41 is generally supported by and suspended from the floor panel 20 and the like to allow the exhaust pipe 41 to vibrate. Thus, the strength fixing the exhaust pipe 41 and the floor panel 20 is not high. Accordingly, when the object X strikes the vehicle, the force of the impact may cause the exhaust pipe 41 to fall down. If the exhaust pipe 41 falls down, the sub-muffler 41a of the exhaust pipe 41 cannot function as a buffer.

In the above embodiment, when the object X strikes the vehicle from the right side with a certain degree of force, the impact will bend and compress the floor panel 20 from the right side toward the inner side in the widthwise direction. This will move the floor side member 12 from the right side toward the inner side in the widthwise direction. The first buffer 50 fixed to the corresponding floor side member 12 is accordingly moved toward the inner side in the widthwise direction. The movement of the first buffer 50 toward the inner side in the widthwise direction causes the inclined surface 52b of the projection 52 to abut against an outer circumferential surface of the sub-muffler 41a. Since the inclined surface 52b is inclined upward from the distal end 52a toward the outer side in the widthwise direction, force acts in the direction orthogonal to the inclined surface 52b on the sub-muffler 41a. That is, force directed toward the inner side in the widthwise direction and toward the diagonally upper side (upper left side in FIG. 3) acts on the sub-muffler 41a. Thus, this limits situations in which the impact produced when the object X strikes the vehicle causes the sub-muffler 41a (exhaust pipe 41) to fall down.

Further, the distal end 52a of the projection 52 of the first buffer 50 is located downward from the lower end of the sub-muffler 41a. This further ensures that the distal end 52a of the projection 52 moves into the area underneath the sub-muffler 41a as the first buffer 50 moves toward the inner side in the widthwise direction. This ensures that the inclined surface 52b, which is the upper surface of the projection 52, abuts against the outer circumferential surface of the sub-muffler 41a and supports the sub-muffler 41a (exhaust pipe 41) with the projection 52.

Further, the first buffer 50 is fixed to the corresponding floor side member 12. The floor side member 12 forms a portion of the frame of the lower vehicle structure and is a highly rigid portion of the vehicle structure. This limits situations in which the object X striking the vehicle excessively deforms the floor side member 12 causing the first buffer 50 to fall down together with the sub-muffler 41a (exhaust pipe 41). As a result, situations in which the sub-muffler 41a does not function as a buffer are limited.

Figure 4:
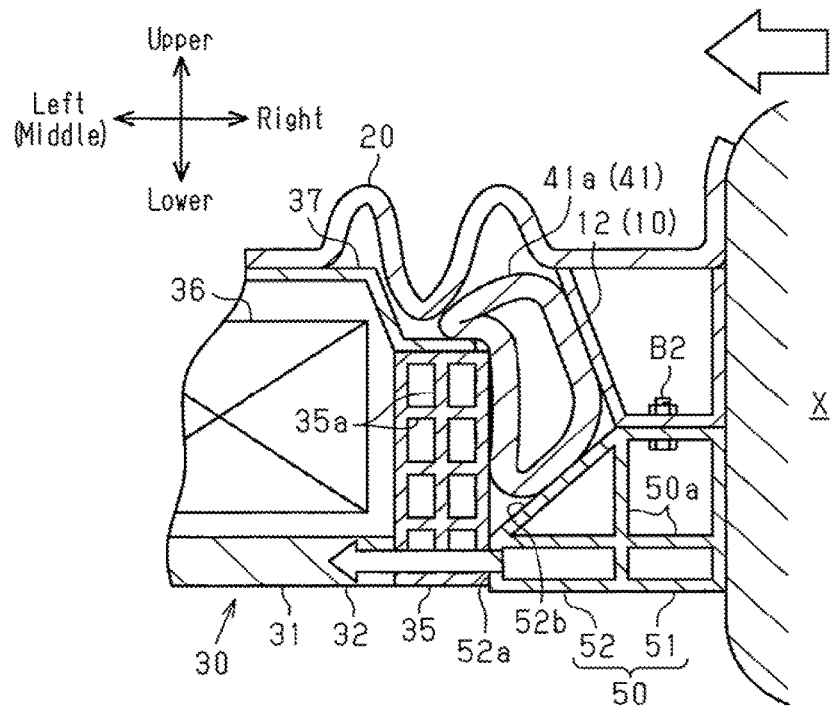
FIG. 4 is a diagram showing the behavior of the lower vehicle structure when an object strikes the vehicle from the outer side in the widthwise direction of the vehicle.

As shown in FIG. 4, when the first buffer 50 further moves toward the inner side in the widthwise direction, the sub-muffler 41a is held within an area surrounded by the inclined surface 52b of the first buffer 50, the floor side member 12, and the battery case 31. This deforms the sub-muffler 41a in the widthwise direction. More specifically, the sub-muffler 41a is held within the area surrounded by the inclined surface 52b of the first buffer 50, the side surface of the floor side member 12 inclined upward from the outer side and toward the inner side in the widthwise direction, and the side surface of the battery case 31 so that the sub-muffler 41a deforms in the widthwise direction. In this manner, some of the impact applied by the object X is consumed as force that deforms the sub-muffler 41a. This reduces the force of the impact that acts on the battery 30.

The structure described above ensures that the exhaust pipe 41 (sub-muffler 41a) functions as a buffer. In contrast with a structure that cannot be expected to have the exhaust pipe 41 function as a buffer, the first buffer 50 as a whole can be expected to sufficiently absorb the force of an impact even when reduced in size. Accordingly, the first buffer 50 may be reduced in size to occupy less space. For example, the technique related to the first buffer 50 may be applied even when the dimensions or the like of the battery 30 and the exhaust pipe 41 limit the apace that is available for the first buffer 50.

When the first buffer 50 further moves toward the inner side in the widthwise direction even after the sub-muffler 41a deforms, the distal end 52a of the projection 52 strikes the battery case 31. Here, the distal end 52a of the projection 52 is located at the same height as the bottom wall 32 of the battery case 31 in the vertical direction of the vehicle. This increases the probability that the distal end 52a of the projection 52 will strike the battery case 31 at the same height as the bottom wall 32. The bottom wall 32 of the battery case 31 extends in the widthwise direction and thus does not easily deform when force in the widthwise direction acts on the bottom wall 32 as compared to, for example, the side walls 35 extending in the vertical direction. Further, in this embodiment, the bottom wall 32 is a solid plate and thus has higher rigidity than a hollow material. Consequently, the bottom wall 32 of the battery case 31 receives most of the force of the impact transmitted from the distal end 52a of the projection 52. This limits damage to the battery cells 36 when the force of the impact acts on the battery cells 36 in the battery case 31.

After the distal end 52a of the projection 52 strikes the battery case 31, the first buffer 50 is held between the object X and the battery case 31 and deformed in the widthwise direction. Thus, some of the force of the impact from the object X is consumed as force that deforms the first buffer 50. This reduces the impact force that acts on the battery 30. In this manner, abutment of the first buffer 50 against the bottom wall 32 of the battery case 31 deforms the first buffer 50 in the widthwise direction. Thus, situations in which the object X reaches the battery 30 after striking the battery case 31 are limited.

In this embodiment, the second buffer 60 is located at the left side of the battery 30. Thus, when an object strikes the vehicle from the left side, the second buffer 60 deforms in the widthwise direction and reduces the force of the impact that acts on the battery 30. Further, the second buffer 60 is fixed to the battery case 31. This limits displacement of the second buffer 60 and the battery 30 when an object strikes the vehicle. Accordingly, situations in which displacement of the second buffer 60 hinders proper impact absorption are limited. This ensures that the second buffer 60 functions to absorb impacts.

It should be apparent to those skilled in the art that the present invention may be embodied in many other specific forms without departing from the spirit or scope of the invention. Particularly, it should be understood that the present invention may be embodied in the following forms.

The internal combustion engine E does not have to be directly used as a drive source. For example, the internal combustion engine E may be exclusively used as a power source for generating power. As long as the exhaust pipe 41 extending from the internal combustion engine E is located between the battery 30 and the first buffer 50, the technique of the above embodiment is applicable regardless of whether or not the internal combustion engine E is used as a drive source or as a power source for generating power.

The shape and internal structure of the battery 30 may be changed taking into account the extending direction of the side members 10, the shape of the floor panel 20, and the structures of other peripheral components.

The cross-sectional shape of the exhaust pipe 41 (sub-muffler 41a) does not have to be a true circle and may be slightly oval.

The exhaust pipe 41 does not have to include the sub-muffler 41a and may include a component other than the sub-muffler 41a. For example, a portion of the exhaust pipe 41 may form a filter that removes microparticles from exhaust gas or a catalyst that reduces nitrogen oxide. Further, the filter or catalyst of the exhaust pipe 41 may be located between the battery 30 and the first buffer 50.

In the above embodiment, the first buffer 50 is a pipe. However, the first buffer 50 may be any member that deforms in the widthwise direction and absorbs an impact when receiving the impact from the outer side in the widthwise direction. For example, the first buffer 50 may be formed from a porous foamed resin or a material that combines a pipe and a foamed resin.

The positional relationship of the distal end 52a of the projection 52 and the bottom wall 32 of the battery case 31 in the vertical direction is not limited to the example of the above embodiment. For example, as long as the side walls 35 of the battery case 31 have high rigidity and the abutment of the distal end 52a of the projection 52 does not excessively deform the battery case 31, the distal end 52a of the projection 52 may be located upward from the bottom wall 32 of the battery case 31. Alternatively, the distal end 52a of the projection 52 may be located downward from the bottoms wall 32 of the battery case 31. In this case, when the first buffer 50 moves toward the inner side in the widthwise direction, the inclined surface 52b, which is the upper surface of the projection 52, abuts against the battery case 31. Thus, force directed toward the inner side in the widthwise direction and toward the diagonally upper side acts on the battery case 31.

Figure 5:
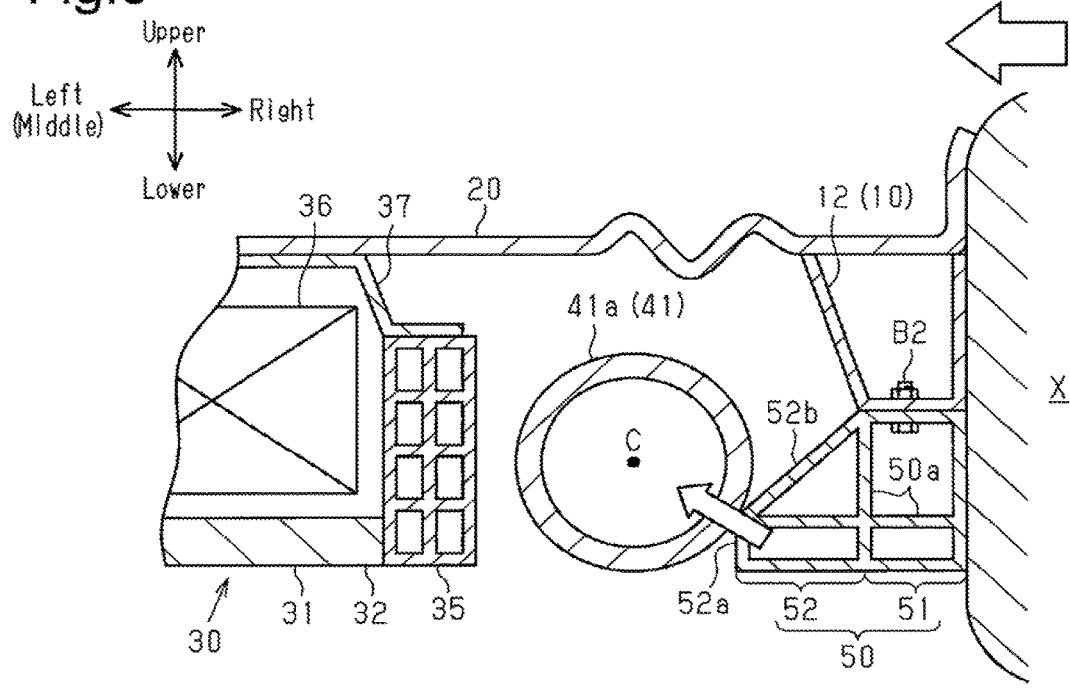
FIG. 5 is a cross-sectional view showing a modified example of a lower vehicle structure.

The positional relationship of the distal end 52a of the projection 52 and the exhaust pipe 41 in the vertical direction is not limited to the example of the above embodiment. For example, as shown in FIG. 5, the distal end 52a of the projection 52 does not have to be located downward from the lower end of the sub-muffler 41a of the exhaust pipe 41 and only needs to be located downward from the center axis C of the sub-muffler 41a. Such a positional relationship allows the carved outer circumferential surface of the sub-muffler 41a to guide the distal end 52a of the projection 52 when the distal end 52a of the projection 52 abuts against the outer circumferential surface of the sub-muffler 41a so that the distal end 52a of the projection 52 moves into the area underneath the sub-muffler 41a. As long as the distal end 52a of the projection 52 moves into the area underneath the sub-muffler 41a, the projection 52 limits situations in which the exhaust pipe 41 falls down.

The first buffer 50 and the side members 10 do not have to be fixed by the bolt B2 and may be fixed by any method that ensures required strength, for example, welding or adhesive. The same applies to the method for fixing the second buffer 60 and the side members 10 and the method for fixing the second buffer 60 and the battery 30.

The first buffer 50 does not have to be fixed to the side members 10 (floor side members 12). For example, the first buffer 50 may be fixed to the floor panel 20. As long as the strength fixing the first buffer 50 and the floor panel 20 is higher than the strength fixing the exhaust pipe 41 and the floor panel 20, the advantage of the above embodiment is obtained in which separation of the exhaust pipe 41 is limited.

Figure 6:
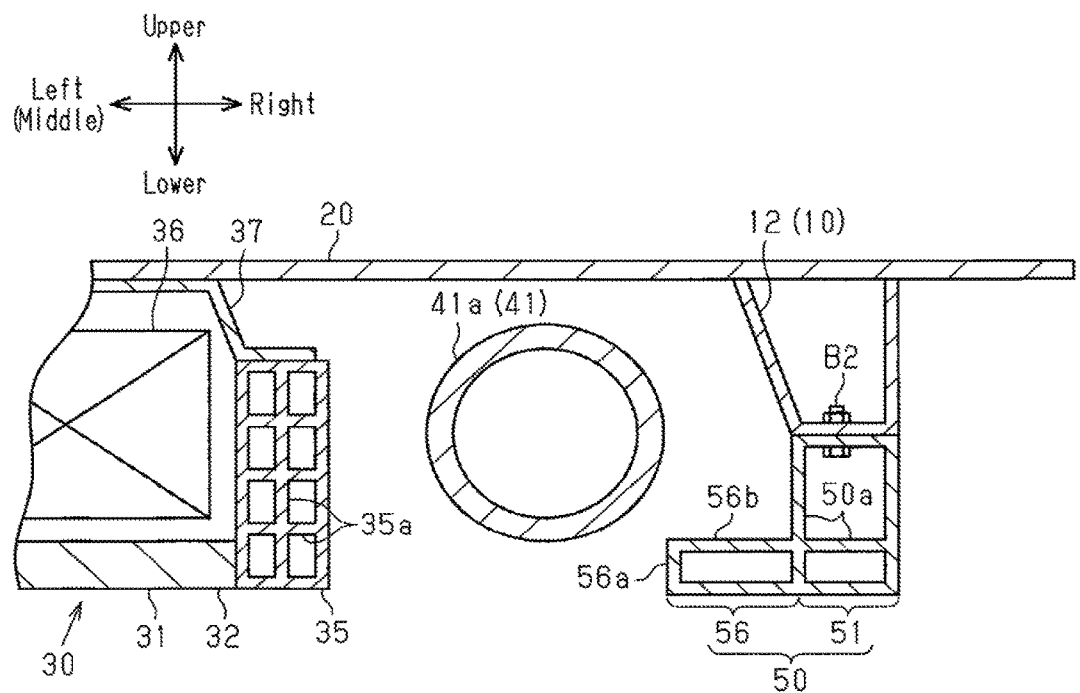
FIG. 6 is a cross-sectional view showing a modified example of a lower vehicle structure.

As long as the distal end 52a of the projection 52 is located downward from the center axis of the exhaust pipe 41 (sub-muffler 41a), the first buffer 50 may have any shape. As long as the projection 52 includes an inclined surface that can abut against the exhaust pipe 41, the same advantages as the above embodiment are obtained regardless of the shape of the first buffer 50. Further, the first buffer 50 does not have to include the inclined surface 52b. For example, as shown in FIG. 6, the first buffer 50 may include a projection 56 projecting from the body 51 toward the battery 30 and having a uniform dimension in the vertical direction. In this case, the projection 56 includes an upper surface 56b that is not inclined with respect to the widthwise direction. Thus, upward force does not easily act on the exhaust pipe 41 through the upper surface 56b of the projection 56. However, when the distal end 56a of the projection 56 moves into the area underneath the sub-muffler 41a, the upper surface 56b of the projection 56 receives the exhaust pipe 41. This limits situations in which the exhaust pipe 41 falls down and ensures that the sub-muffler 41a of the exhaust pipe 41 functions as a buffer.

The second buffer 60 does not have to be fixed to the battery case 31. Since the second buffer 60 is fixed to the left side member 10 (left floor side member 12), the position of the second buffer 60 is fixed even when the second buffer 60 is not fixed to the battery case 31. As another option, the second buffer 60 may be fixed to the battery case 31 and not fixed to the side member 10.

The second buffer 60 may be formed integrally with the battery case 31 (side walls 35). Even when the second buffer 60 is integrated with the battery case 31, the second buffer 60 and the battery case 31 do not move relative to each other and are thus fixed to each other.

The second buffer 60 may be omitted. For example, as long as the side member 10, the floor panel 20, and the like are shaped to protect the battery 30 from an impact from the left side, the second buffer 60 does not necessarily have to be used.

In the above embodiment, the layout of the left and right sides may be reversed. That is, the exhaust pipe 41 and the first buffer 50 may be located at the left side of the battery 30 in the widthwise direction, and the second buffer 60 may be located at the right side of the battery 30 in the widthwise direction.

The exhaust pipe 41 may be arranged not only at the right side of the battery 30 in the widthwise direction but also at the left side of the battery 30 in the widthwise direction. In this case, it is preferred that the first buffer 50 be arranged at the left side of the battery 30 in a manner similar to the structure of the right side of the battery 30.

The present examples and embodiments are to be considered as illustrative and not restrictive, and the invention is not to be limited to the details given herein, but may be modified within the scope and equivalence of the appended claims.

The invention claimed is:

1. A lower vehicle structure configured to be applied to a vehicle including an internal combustion engine and a travel motor, the lower vehicle structure comprising:
   a floor panel that forms a floor surface of a passenger compartment;
   a battery located below the floor panel, wherein the battery is configured to supply power to the travel motor;
   a first buffer located below the floor panel at an outer side of the battery in a widthwise direction of the vehicle, wherein the first buffer is configured to deform in the widthwise direction in order to absorb an impact; and
   a cylindrical exhaust pipe located below the floor panel, wherein the exhaust pipe extends in a front-to-rear direction of the vehicle, and the exhaust pipe is configured so that exhaust gas from the internal combustion engine flows through the exhaust pipe, wherein
   a portion of the exhaust pipe is located between the battery and the first buffer in the widthwise direction, and
   the first buffer includes a projection that projects toward the battery, and the projection includes a distal end located downward from a center axis of the exhaust pipe in a vertical direction of the vehicle.

2. The lower vehicle structure according to claim 1, wherein
   the project ion includes an upper surface, and
   the upper surface is an inclined surface inclined upward from the distal end of the projection toward the outer side in the widthwise direction.

3. The lower vehicle structure according to claim 1, further comprising two side members extending in the front-to-rear direction, wherein
   the floor panel is fixed to upper portions of the two side members, and
   the first buffer is fixed to one of the two side members.

4. The lower vehicle structure according to claim 3, wherein
   one of the two side members, to which the first buffer is fixed, includes a side surface opposing the exhaust pipe, and
   the side surface is inclined upward from the outer side and toward an inner side in the widthwise direction.

5. The lower vehicle structure according to claim 1, wherein
   the battery includes
      a battery case having a flat bottom wall that extends in the widthwise direction and a peripheral wall that projects from an edge of the bottom wall, and
      battery cells accommodated in the battery case, and
   the distal end of the projection is located at the same height as the bottom wall of the battery case in the vertical direction.

6. The lower vehicle structure according to claim 5, further comprising a second buffer located below the floor panel at a side of the battery opposite to the first buffer in the widthwise direction, wherein
   the second buffer is fixed to the battery case and configured to deform in the widthwise direction in order to absorb an impact.

7. The lower vehicle structure according to claim 1, wherein the distal end of the projection is located downward from a lower end of the exhaust pipe.

* * * * *